United States Patent [19]

Laurel

[11] Patent Number: 4,770,203
[45] Date of Patent: Sep. 13, 1988

[54] HYDRANT AND COMPONENTS THEREOF

[75] Inventor: David F. Laurel, Duncan, Okla.

[73] Assignee: Halliburton Company, Duncan, Okla.

[21] Appl. No.: 146,984

[22] Filed: Jan. 22, 1988

[51] Int. Cl.⁴ .................... F16K 31/50; F16K 3/36
[52] U.S. Cl. .................... 137/298; 137/296; 251/268; 251/267; 251/355
[58] Field of Search ............... 137/272, 296, 298; 251/267, 268, 269, 270, 355

[56] References Cited

U.S. PATENT DOCUMENTS

| | | | |
|---|---|---|---|
| D. 200,565 | 3/1965 | Jackson | D91/3 |
| D. 205,984 | 10/1966 | Smith | D91/3 |
| D. 218,425 | 8/1970 | Smith | D23/12 |
| D. 218,426 | 8/1970 | Smith | D23/12 |
| D. 221,753 | 9/1971 | Smith | D23/12 |
| D. 221,754 | 9/1971 | Smith | D23/12 |
| D. 222,695 | 12/1971 | Smith | D23/12 |
| 2,019,919 | 11/1935 | Lofton | 137/298 |
| 2,100,862 | 11/1937 | Lofton | 137/298 |
| 2,576,631 | 11/1951 | Mueller et al. | 137/296 |
| 3,185,171 | 5/1965 | Mueller et al. | 137/283 |
| 3,223,110 | 12/1965 | Mueller et al. | 137/298 |
| 3,236,543 | 2/1966 | Mueller | 285/2 |
| 3,248,786 | 5/1966 | Smith | 29/213 |
| 3,294,109 | 12/1966 | Smith | 137/298 |
| 3,331,397 | 7/1965 | Mueller et al. | 137/797 |
| 3,380,471 | 4/1968 | Mueller et al. | 137/298 |
| 3,439,947 | 4/1969 | Luckenbill et al. | 287/108 |
| 3,475,978 | 11/1969 | Dunton | 74/89.15 |
| 3,532,109 | 10/1970 | Smith | 137/296 |
| 3,586,019 | 6/1971 | Thomas et al. | 137/68 |
| 3,633,873 | 1/1972 | Leopold, Jr. et al. | 251/326 |
| 3,738,390 | 6/1973 | Luckenbill | 137/797 |
| 3,930,096 | 9/1976 | Ellis et al. | 137/283 |
| 3,961,642 | 6/1976 | Thomas et al. | 137/272 |
| 3,980,097 | 9/1976 | Ellis | 137/283 |
| 4,000,753 | 1/1977 | Ellis | 137/296 |
| 4,073,307 | 2/1978 | Royce | 137/283 |
| 4,083,377 | 4/1978 | Luckenbill | 137/296 |
| 4,139,931 | 2/1979 | Royce | 29/157.1 R |
| 4,141,574 | 2/1979 | Stansifer et al. | 285/92 |
| 4,154,259 | 5/1979 | Ellis et al. | 137/298 |
| 4,177,826 | 12/1979 | Luckenbill | 137/307 |
| 4,227,544 | 10/1980 | Luckenbill | 137/307 |
| 4,303,223 | 12/1931 | Whisenhunt et al. | 251/357 |
| 4,554,944 | 11/1985 | Daghe et al. | 137/296 |
| 4,566,481 | 1/1986 | Leopold, Jr. et al. | 137/296 |
| 4,651,771 | 3/1987 | Borenstein et al. | 137/296 |

OTHER PUBLICATIONS

Waterous brochure entitled "Waterous Trend".
Waterous brochure entitled "Waterworks and Fire Protection Products".
U.S. Pipe brochure entitled "The U.S. Pipe Metropolitan TM Fire Hydrants".
Mueller brochure entitled "Efficient Hydrant Design Assures Maximum Flow".

*Primary Examiner*—George L. Walton
*Attorney, Agent, or Firm*—James R. Duzan; E. Harrison Gilbert, III

[57] ABSTRACT

A hydrant includes one or more novel and improved features, namely: (1) a nozzle assembly comprising a nozzle and a retainer ring mounted from within the upper standpipe section of the hydrant; (2) an operating assembly defining an excess reservoir volume to receive valve stem lubricating fluid to prevent blocking movement of the valve stem; (3) a coupling assembly including a collar, a retainer ring for engaging one end of the collar against one standpipe section, and a retainer bar inserted through the collar and bent around an adjoining standpipe section; (4) a coupling assembly including a floating seal band carrying two seals, one of which seals against one standpipe section and the other of which seals against an adjoining standpipe section; (5) an otherwise conventional valve body but for a double-D valve body cavity in which a complemental boss of a valve member retainer disk is nested to prevent rotation therebetween, and also including a flat sealing gasket disposed between the valve stem and an annular surface of an upper cavity of the valve body.

20 Claims, 9 Drawing Sheets

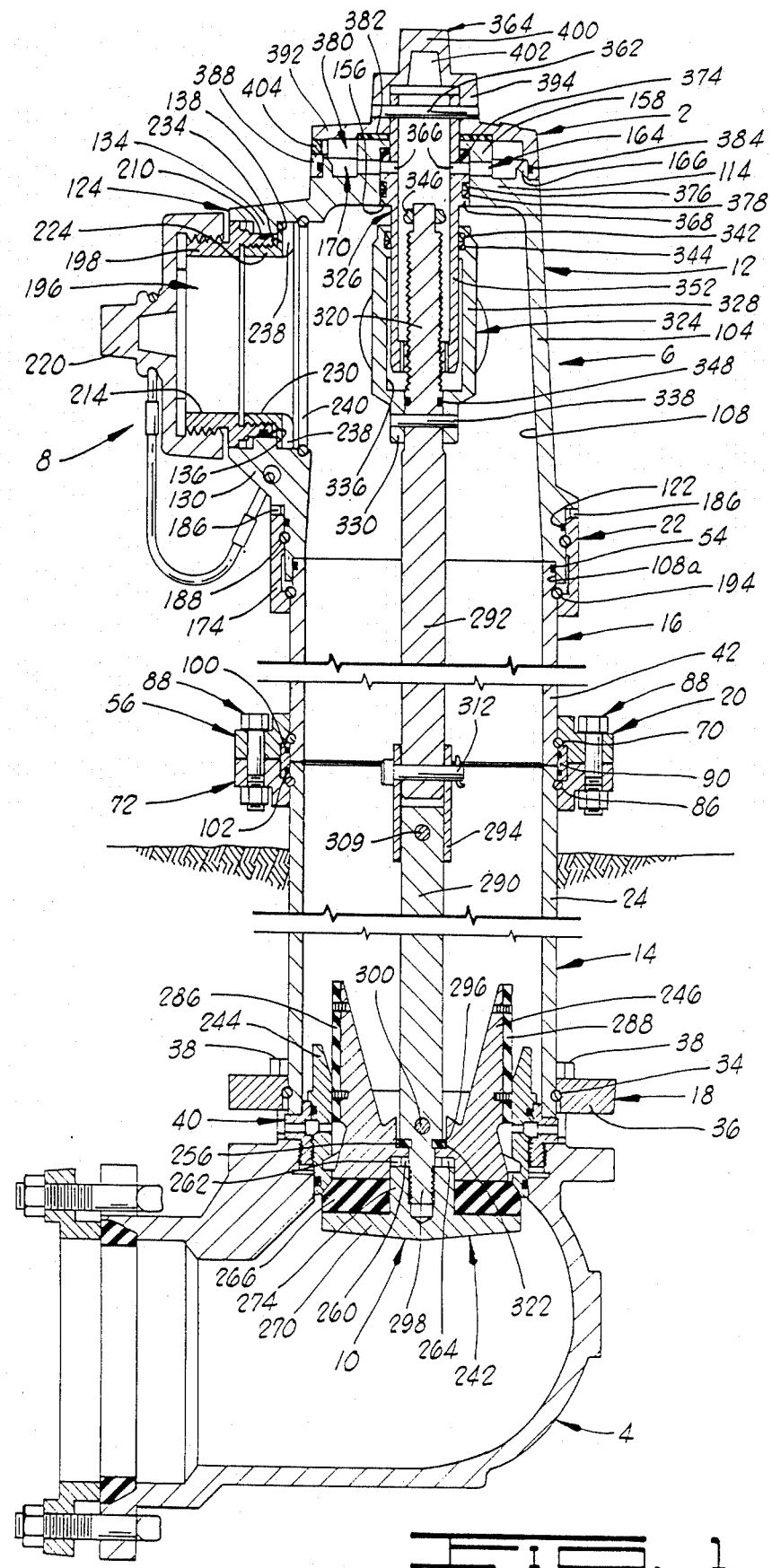

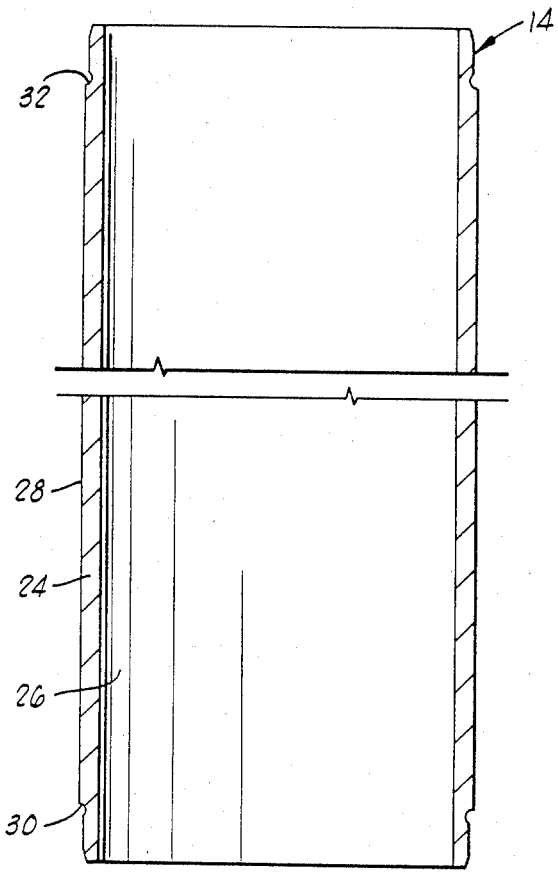
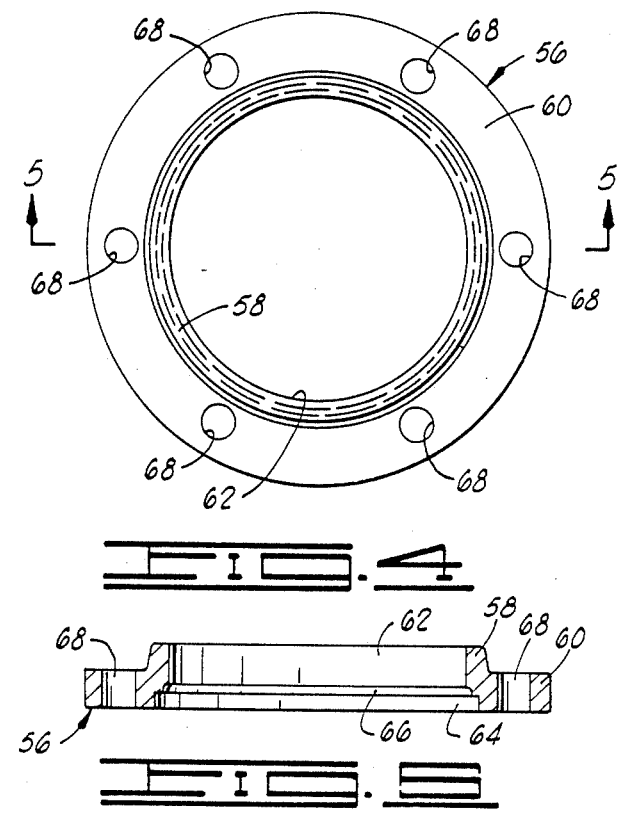
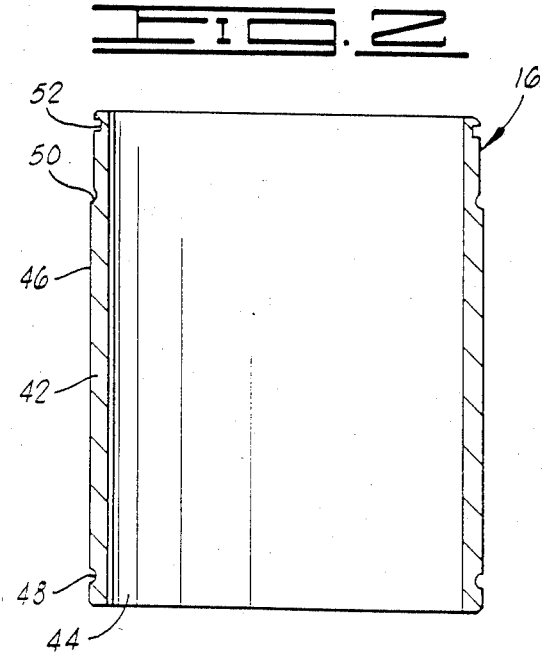
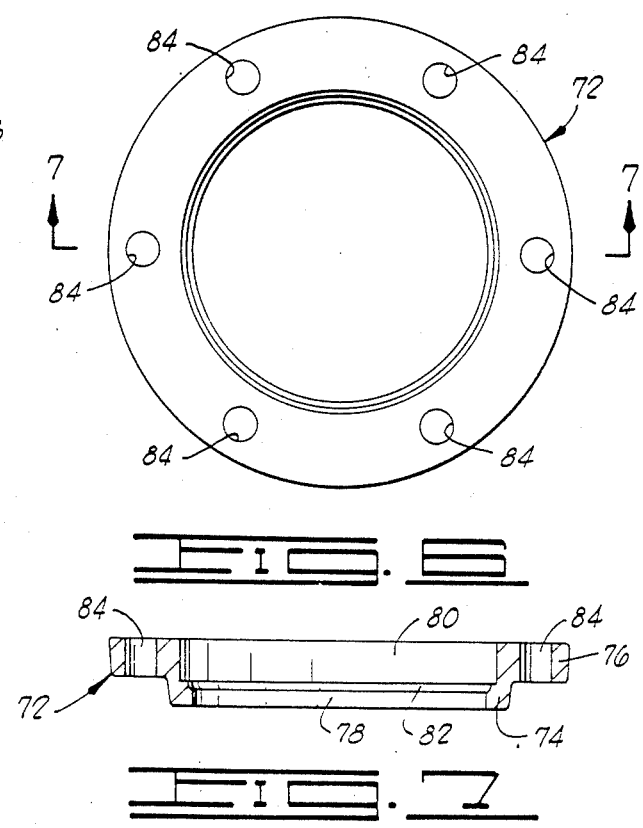

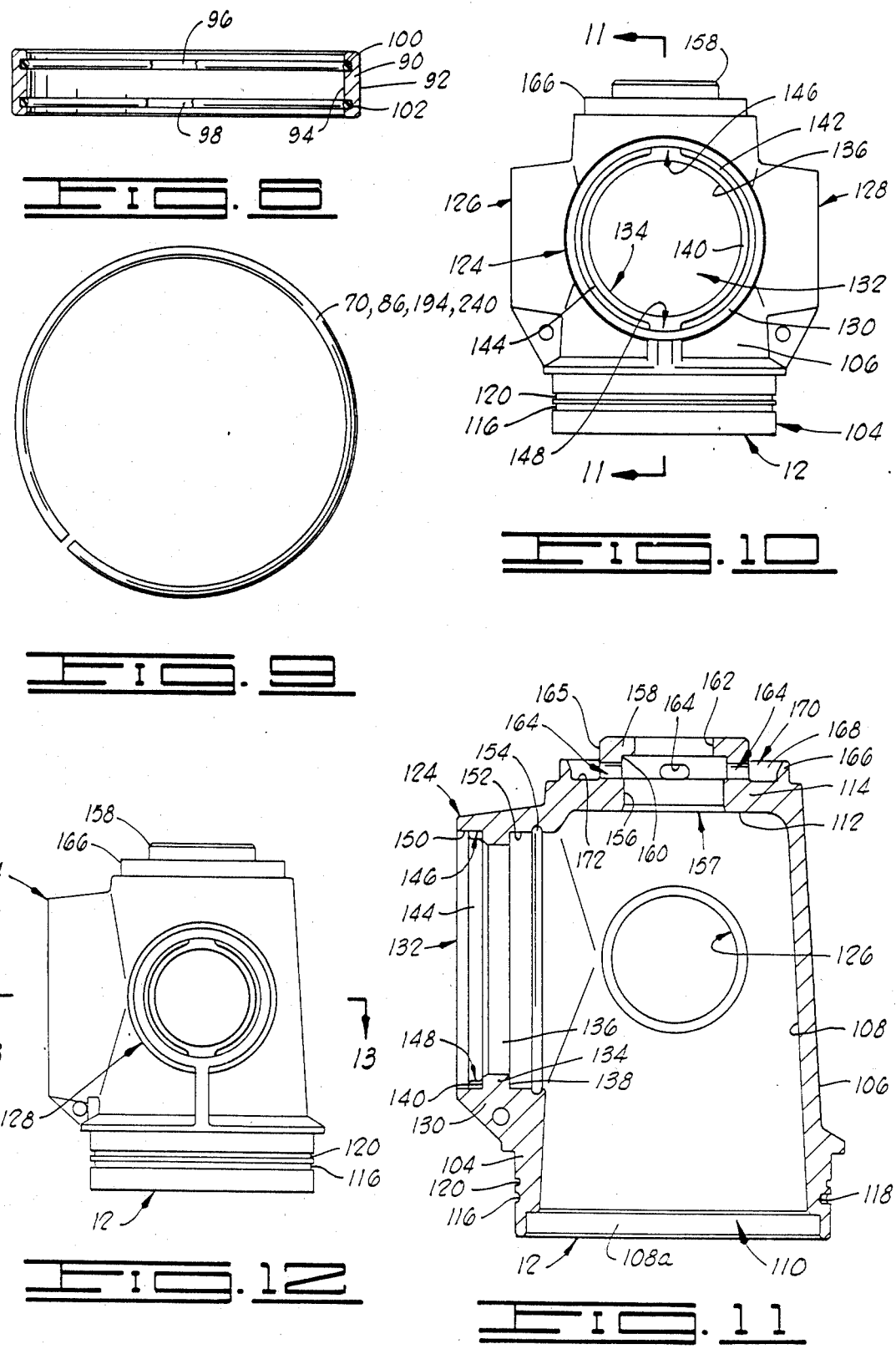

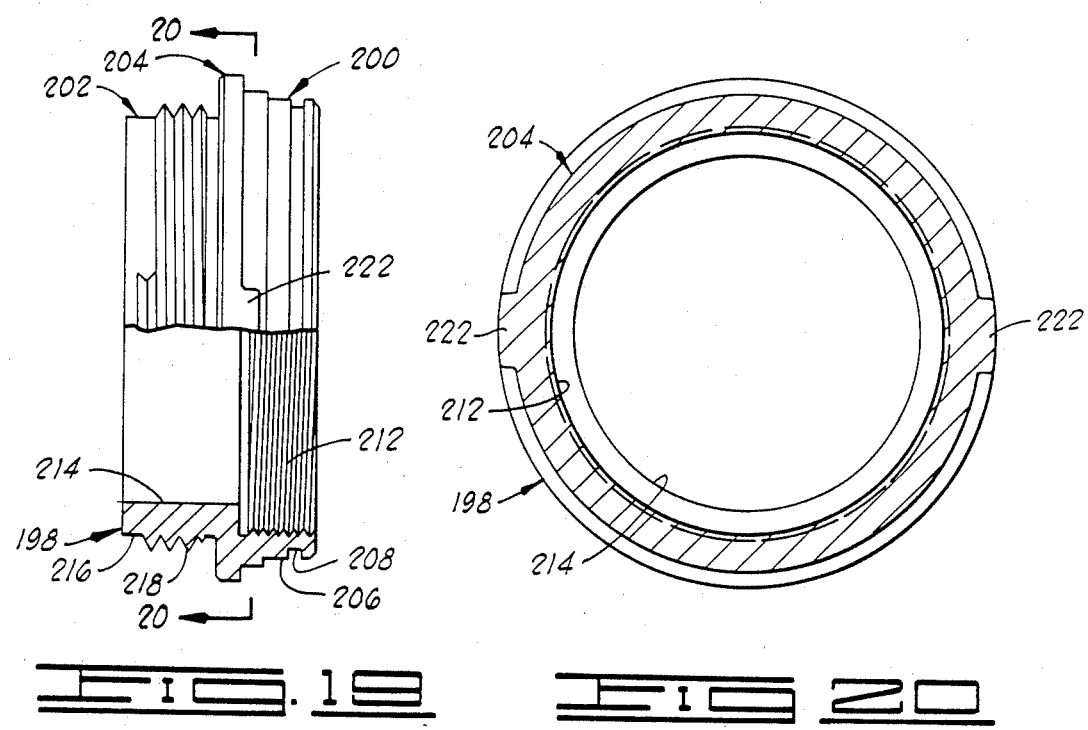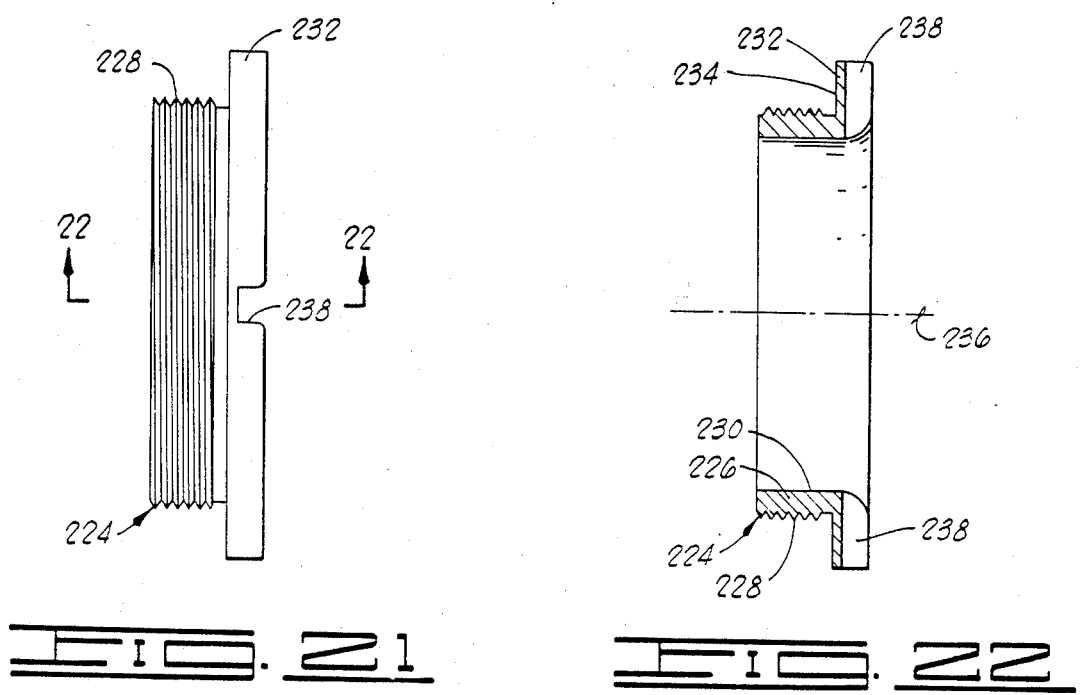

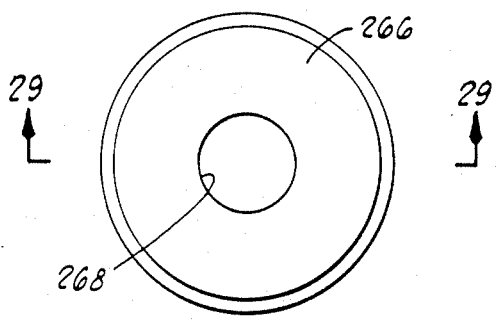
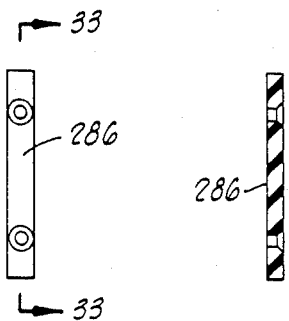
FIG.28
FIG.32
FIG.33
FIG.29
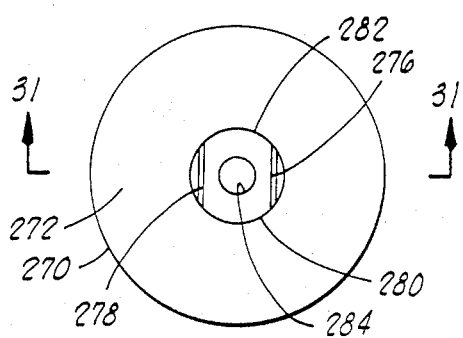
FIG.30
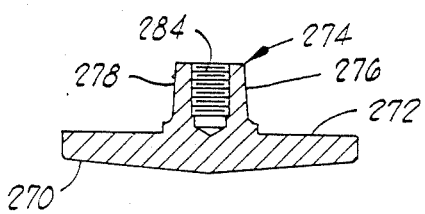
FIG.31
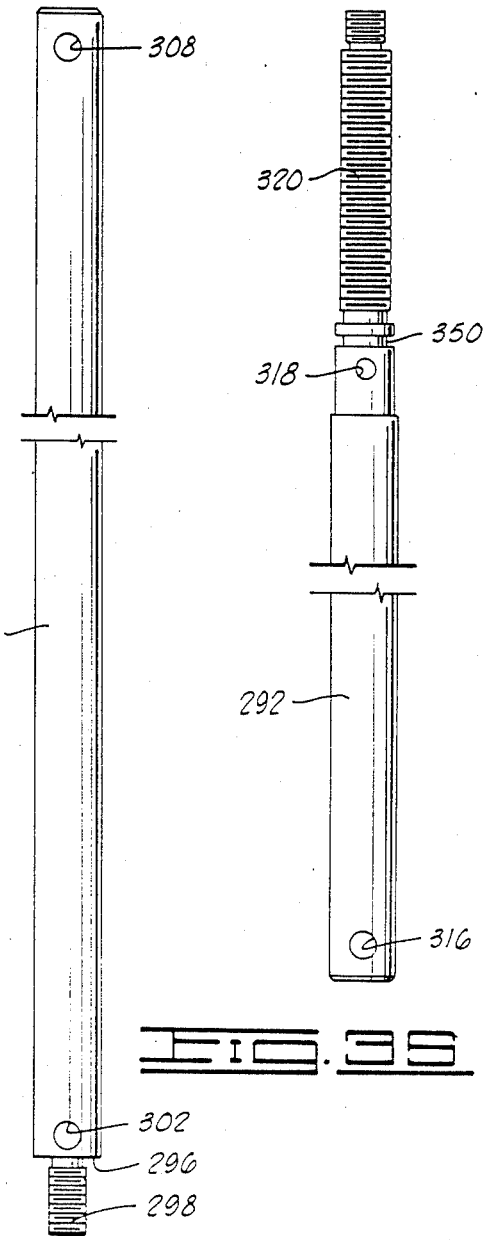
FIG.34
FIG.35

HYDRANT AND COMPONENTS THEREOF

BACKGROUND OF THE INVENTION

This invention relates generally to hydrants and components thereof and more particularly, but not by way of limitation, to subcombinations of a nozzle assembly for a hydrant, an operating assembly for a valve stem of a valve of a hydrant, hydrant standpipe coupling assemblies and method, and combinations of these subcombinations in a hydrant.

Hydrants connected to waterlines of a community provide water outlets throughout the community for use in fighting fires, for example. Such hydrants of necessity need to be located conspicuously so that they are readily accessible when needed. This accessibility for their intended use, however, also exposes the hydrants to vandalism.

Such vandalism has included the removal of hydrant nozzles which are needed to connect fire hoses to the hydrants. A hydrant without a nozzle is, of course, not usable until it is fixed. This creates the danger of rendering the hydrant inoperative when a fire occurs, and it requires additional public funds to be spent to repair it. Therefore, there is the need for an improved nozzle assembly which is difficult for unauthorized individuals to remove.

Vandals have also damaged hydrants by disassembling their standpipe sections. That is, the main conduit portion of a hydrant is often comprised of two or more stacked standpipe sections. In at least one conventional form, these sections are bolted together at flanged joints which have been unbolted or otherwise separated by vandals. Therefore, there is also the need for a tamper-resistant standpipe coupling assembly and method.

Another needed coupling feature is a floating seal ring which provides longitudinally movable seals against each of two joined standpipe sections disposed within the means for securing the two sections together. Such a floating seal allows the securing means to be simplified in that the securing means need not itself seal as this is accomplished by the floating seal ring which, because of its longitudinal movability, adjusts to whatever position the securing means causes it to assume longitudinally along the joint. Such a floating seal also permits a small amount of separation between the two standpipe sections while maintaining internal pressure integrity.

Not only does the accessibility of hydrants expose the hydrants to vandalism, but also it exposes the hydrants to all types of weather conditions. One result of this latter exposure can be that moving components, such as the valve actuating assembly by which the valve of the hydrant is operated, can rust or otherwise become inoperable if it is not adequately protected. One way of protecting this actuating mechanism is to lubricate the mechanism. To do this, a liquid lubricant, such as oil, is maintained in a lubricant reservoir through which the operating parts of the mechanism move. Care needs to be taken in filling some types of these reservoirs because if too much fluid is used when the actuating mechanism is in a particular position, the lubricant can lock or prevent normal operation of the mechanism when the actuating mechanism is attempted to be moved to another position. That is, in these types excessive lubricant fills the volume through which the operating parts of the mechanism need to move so that these operating parts are hydraulically blocked or locked by the lubricating fluid. This problem is referred to herein as hydralock. To obviate the necessity of having to measure carefully a predetermined amount of lubricant when filling a lubricant reservoir and to obviate the necessity of having to be concerned with the position of the operating mechanism when the reservoir is filled, there is the need for an improved operating assembly which is not susceptible to hydralock.

Each of the aforementioned features is individually needed and useful on its own within any particular overall hydrant design. They are also useful in their various combinations defining new and improved hydrants, which hydrants can incorporate other improved features, such as a specific design of a valve member retaining and sealing assembly.

SUMMARY OF THE INVENTION

The present invention satisfies the aforementioned needs by providing a novel and improved hydrant and components thereof. The present invention is described herein as an improved hydrant which includes the aforementioned new and improved features of a tamper-resistant nozzle assembly, a non-hydralocking operating assembly, a tamper-resistant standpipe coupling assembly, and a specific design of valve member retaining and sealing assembly; a floating seal standpipe coupling assembly is also described. The invention claimed herein, however, is directed to only certain of these aspects with the other aspects being claimed in related cases filed concurrently herewith. Moreover, it is to be noted that although the hydrant is described herein with respect to all the features, the present invention encompasses other hydrants having only one or some other combination of these features.

The present invention provides a nozzle assembly for a hydrant which includes a water outlet port. The nozzle assembly comprises: a nozzle including an inlet portion, and retainer means for holding the nozzle in the water outlet port of the hydrant in response to the retainer means engaging the inlet portion of the nozzle from within the hydrant. The nozzle further includes means for engaging the hydrant to secure the nozzle within the water outlet port against rotation relative to the hydrant. The retainer means includes a ring including connector means for connecting with the inlet portion of the nozzle and further including abutment means, connected to the connector means, for abutting the hydrant inside of the water outlet port. The abutment means includes means for receiving, through the nozzle and the ring from outside the hydrant, a tool with which to turn the ring. The nozzle assembly further comprises means, adapted for mounting within the hydrant inwardly of the retainer means, for preventing the retainer means from falling into a portion of the hydrant below the water outlet port.

The present invention provides an operating assembly for a valve stem of a valve of a hydrant. The operating assembly comprises: a hydrant head having a top in which a fluid-receiving channel is defined; a hydrant bonnet sealingly connected to the top of the hydrant head so that an excess reservoir volume is defined by the hydrant bonnet contiguous with the fluid-receiving channel of the hydrant head; and an operating nut connected to the hydrant bonnet and adapted for coupling with the valve stem of the hydrant, which operating nut has defined therein a chamber adapted to receive an end of the valve sstem and disposed in communication with the fluid-receiving channel of the hydrant head. The hydrant bonnet has a cavity defined therein in communication with the chamber of the operating nut. The hydrant bonnet also has a fluid fill port defined therein in communication with the excess reservoir volume below the cavity of the hydrant bonnet and above the fluid-receiving channel of the hydrant head.

The present invention provides a hydrant standpipe coupling assembly and method. This coupling assembly comprises: a first standpipe section including an outer surface in which a recess is defined; a second standpipe section; a collar including a first inner circumferential engagement surface and a second inner circumferential engagement surface, which collar further includes an outer surface through which an opening is defined, the opening intersecting the first inner circumferential engagement surface; a retainer bar including an end disposed through the hole of the collar into the recess of the first standpipe section, the retainer bar bent around the first standpipe section in response to rotation of the collar relative to the first standpipe section so that the retainer bar engages the first standpipe section and the first inner circumferential engagement surface of the collar; and a retainer ring mounted on the second standpipe section so that the retainer ring extends therefrom and engages the second inner circumferential engagement surface of the collar. The method of coupling comprises the steps of sliding a retaining sleeve over an end of the second standpipe section, which sleeve includes a first inner engagement surface, a second inner engagement surface and an outer surface through which an opening is defined, the opening intersecting the first inner engagement surface; mounting a retainer ring on the second standpipe section so that the retainer ring is located between the second inner engagement surface of the retaining sleeve and the end of the second standpipe section; positioning the first standpipe section in alignment with the second standpipe section with an end of the first standpipe section adjacent the end of the second standpipe section; moving the retaining sleeve relative to the aligned first and second standpipe sections so that the second inner engagement surface is adjacent the retainer ring and so that the first inner engagement surface is radially aligned with an external groove of the first standpipe section; inserting an end of a rod through the opening of the retaining sleeve and retaining the end of the rod in the external groove of the first standpipe section; and rotating the retaining sleeve relative to the first standpipe section and thereby pulling the rod through the opening of the retaining sleeve and bending the rod into the external groove of the first standpipe section so that the rod engages both the external groove of the first standpipe section and the first inner engagement surface of the retaining sleeve, whereby the retainer ring, the rod and the retaining sleeve couple the first standpipe section to the second standpipe section.

The present invention provides another hydrant standpipe coupling assembly, comprising: a first standpipe section; a second standpipe section longitudinally aligned with the first standpipe section in end-to-end relation; floating seal means, movable longitudinally relative to the first and second standpipe sections, for providing a seal around the first standpipe section and for providing a seal around the second standpipe section; and securing means, overlying the floating seal means, for securing the first standpipe section to the second standpipe section.

The overall hydrant of the present invention includes these features individually and in combination.

Therefore, from the foregoing, it is a general object of the present invention to provide a novel and improved hydrant and components thereof. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is a sectional elevational view of the preferred embodiment hydrant embodying individual features of the present invention.

FIG. 2 is a sectional elevational view of a lower standpipe section of the hydrant.

FIG. 3 is a sectional elevational view of a middle standpipe section of the hydrant.

FIG. 4 is a plan view of an upper flange piece of a flange connector of the hydrant.

FIG. 5 is a sectional elevational view of the upper flange section.

FIG. 6 is a plan view of a lower flange section of the flange connector of the hydrant.

FIG. 7 is a sectional elevational view of the lower flange section.

FIG. 8 is a sectional elevational view of a floating seal ring.

FIG. 9 is a plan view of a split retainer ring used with the flange connector and elsewhere in the hydrant.

FIG. 10 is a side elevational view of an upper standpipe section defining a hydrant head of the hydrant.

FIG. 11 is a sectional view of the upper standpipe section taken along line 11—11 shown in FIG. 10.

FIG. 12 is an elevational view of another side of the upper standpipe section.

FIG. 19 is a partial sectional elevational view of a nozzle of the hydrant.

FIG. 20 is a sectional view of the nozzle taken along line 20—20 shown in FIG. 19.

FIG. 21 is an elevational view of a retainer ring used with the nozzle of the hydrant.

FIG. 22 is a sectional view of the retainer ring taken along line 22—22 shown in FIG. 21.

FIG. 28 is a plan veiw of a seal member of the valve of the hydrant.

FIG. 29 is a sectional view of the seal member taken along line 29—29 shown in FIG. 28.

FIG. 30 is a plan veiw of a seal retainer of the valve of the hydrant.

FIG. 31 is a sectional view of the seal retainer taken along line 31—31 shown in FIG. 30.

FIG. 32 is an elevational view of a side seal member of the valve of the hydrant.

FIG. 33 is a sectional view of the side seal member taken along line 33—33 shown in FIG. 32.

FIG. 34 is an elevational view of a lower valve stem section of the valve of the hydrant.

FIG. 35 is an elevational view of an upper valve stem section of the valve of the hydrant.

DETAILED DESCRIPTION OF THE PREFERRED EMBODIMENT

Figure 13:
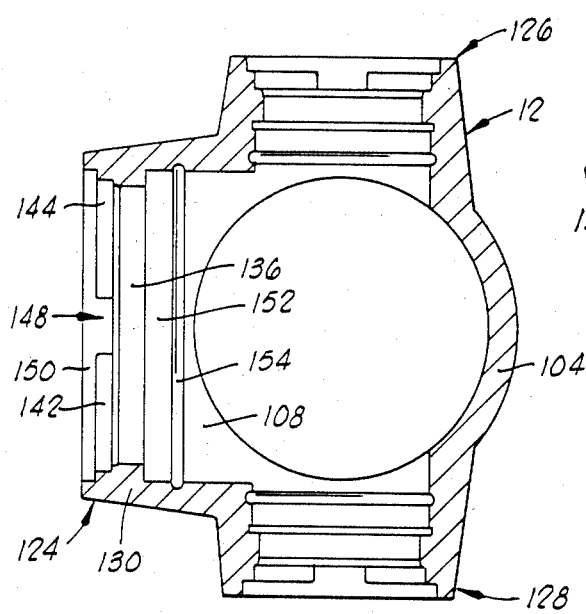
FIG. 13 is a sectional view of the upper standpipe section taken along line 13—13 shown in FIG. 12.
Figure 14:
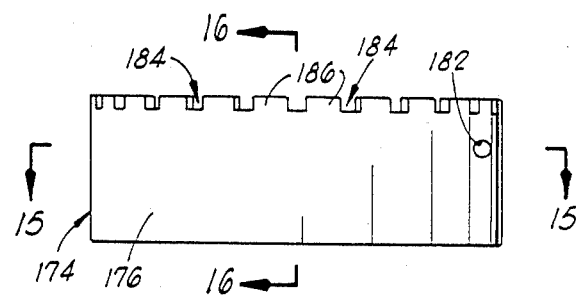
FIG. 14 is an elevational view of a retaining collar of the hydrant.
Figure 15:
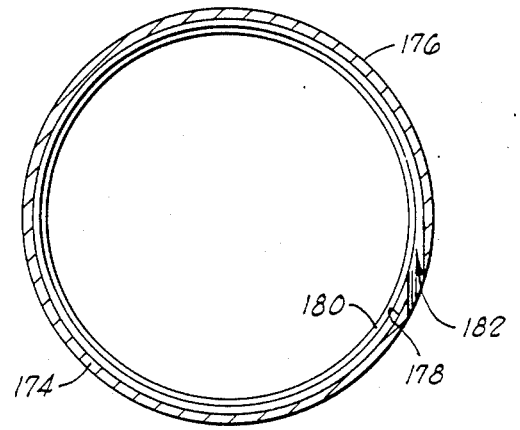
FIG. 15 is a sectional view of the collar taken along line 15—15 shown in FIG. 14.

A hydrant 2 including a combination of the subcombinations of the present invention is depicted in FIG. 1. The hydrant 2 extends vertically from a connection to a waterline including a conventional shoe 4 connected to a watermain (not shown) of a community's public water supply system.

It is to be noted that terms such as "vertical," as well as "horizontal," "upper," "lower," and the like, are with reference to the orientation of the hydrant 2 as viewed in FIG. 1. Specifically, "vertical" is along the length of the sheet of FIG. 1, "horizontal" is along the width of the sheet, "upper" is toward the top of the sheet, and "lower" is toward the bottom of the sheet.

Broadly, the hydrant 2 includes a support and conduit structure 6, a hose connector structure 8 and a water flow control structure 10, each of which structures will be more particularly described hereinbelow with reference to FIG. 1 and the remaining drawings.

The support and conduit structure 6 comprises an upper standpipe, or hydrant head, section 12 and means for connecting the section 12 to a water line. The means for connecting includes a lower standpipe section 14, a middle standpipe section 16, coupling means 18 for coupling the lower standpipe section 14 to the waterline shoe 4, a coupling assembly 20 for coupling the middle standpipe section 16 to the lower standpipe section 14, and a coupling assembly 22 for coupling the upper standpipe section 12 to the middle standpipe section 16.

As shown in FIGS. 1 and 2, the lower standpipe section 14 includes a cylindrical wall 24 having an inner surface 26 defining a hollow interior region throughout the length of the standpipe section 14. The wall 24 also has an outer surface 28 in which an outer circumferential groove 30 is defined near the lower end of the standpipe section 14 and in which an outer circumferential groove 32 is defined near the upper end of the standpipe section 14.

As shown in FIG. 1, the lower end of the standpipe section 14 is mounted on the shoe 4. A metal ring 34 mounted in the lower groove 30 supports a circular flange 36 which is bolted to the shoe 4 by a number of bolts 38, two of which are partially shown in FIG. 1. As illustrated in FIG. 1, the standpipe section 14 is not mounted directly adjacent the shoe 4, but rather is mounted thereto through a conventional drain structure 40 of a type as known to the art for allowing water within the hollow interior region of the standpipe section 14 to drain therefrom. The components 34, 36, 38, 40 are included in the preferred embodiment coupling means 18 by which the lower standpipe section 14, and thus the overall hydrant 2, are connected to the shoe 4.

Longitudinally aligned in end-to-end relation with the lower standpipe section 14 is the middle standpipe section 16 illustrated in FIGS. 1 and 3. The standpipe section 16 includes a cylindrical wall 42 having an inner surface 44 defining a hollow interior region throughout the length of the standpipe section 16. The wall 42 also has an outer surface 46. Defined in the outer surface 46 near the lower end of the standpipe section 16 is a circumferential groove 48. Defined in the outer surface 46 near the upper end of the standpipe section 16 are circumferential grooves 50, 52. The groove 52 receives a sealing O-ring 54 shown in FIG. 1.

The middle standpipe section 16 is connected with its lower end adjacent the upper end of the lower standpipe section 14 in a stacked manner as illustrated in FIG. 1. These two sections are secured together by the coupling assembly 20 which in the preferred embodiment includes a conventional securing means for securing the two standpipe sections together. This conventional securing means includes an upper circular flange 56 which includes a hub 58 from which a rim 60 radially extends around the circumference of the hub 58. The hub 58 has coaxial inner surfaces 62, 64 wherein the surface 64 has a larger diameter than the surface 62 but which surface 64 is connected to the surface 62 through a groove 66. Six longitudinal holes 68 are formed through and equidistantly spaced around the rim 60 as shown in FIG. 4.

The groove 66 receives a split retaining ring 70 (see FIG. 9) which is mounted in the groove 48 near the lower end of the middle standpipe section 16 (see FIG. 1). The ring 70 defines means, connected to the standpipe section 16, for engaging the flange 56 adjacent the standpipe section 16.

The coupling assembly 20 further includes a flange 72 having a hub 74 from which a radial rim 76 extends around the circumference thereof (see FIGS. 6 and 7). The hub 74 has inner surfaces 78, 80 coaxially aligned but with the surface 80 disposed radially outwardly of the surface 78. A grooved surface 82 extends between the surfaces 78, 80. Holes 84 are defined through the rim 76.

The groove 82 receives a retaining ring 86 of the same type as shown in FIG. 9. The ring 86 is mounted in the upper groove 32 of the lower standpipe section 14 as illustrated in FIG. 1. The ring 86 defines means, connected to the standpipe section 14, for engaging the flange 72 adjacent the standpipe section 14.

With the flange 56 held against the retaining ring 70 and with the flange 72 held against the retaining ring 86, the flanges 56, 72 are fastened together by suitable fastening means, such as nut and bolt combinations 88 passing through the aligned sets of holes 68, 84 as depicted in FIG. 1. Although this conventional type of coupling assembly 20 just described is used in the preferred embodiment of the hydrant 2, it is contemplated that this conventional coupling assembly can be modified to accommodate a novel feature of the present invention, namely, a floating seal means, movable longitudinally relative to the standpipe sections 14, 16, for providing a seal around the middle standpipe section 16 and for providing a seal around the lower standpipe section 14. This floating seal means allows a small amount of separation between the two joined standpipe sections while maintaining pressure integrity within the hollow interior region of the aligned standpipe sections. In the preferred embodiment the floating seal means includes a circular band 90 including a cylindrical outer surface 92 and a cylindrical inner surface 94 (see FIG. 8). Two circumferential grooves 96, 98 are defined in the surface 94. The grooves 96, 98 are disposed within the surface 94 and relative to each other so that the groove 96 is disposed radially outwardly from and overlying the standpipe section 16 and the groove 98 is disposed radially outwardly from and overlying the standpipe section 14 when the band 90 is positioned around the adjacent ends of the sections 14, 16 as represented in FIG. 1. To effectuate the sealing, the band 90 carries a sealing O-ring 100 in the groove 96 and a sealing O-ring 102 in the grooe 98 so that the surface of the O-ring 100 sealingly engages the standpipe section 16 and the surface of the O-ring 102 sealingly engages the standpipe section 14 when the band 90 is positioned as represented in FIG. 1.

To use the floating seal means just described, the circular band 90 is placed over the upper end of the lower standpipe section 14 before the middle standpipe section 16 is stacked on the standpipe section 14. After this, the standpipe section 16 is then mounted and the band 90 is slid so that the seals 100, 102 sealingly engage the outer surfaces of the standpipe sections 16, 14, respectively. The retaining rings 70, 86 and the flanges 56, 72 are then assembled and fastened as shown in FIG. 1 in overlying relationship to the band 90. As the flanges 56, 72 are fastened together, the band 90 moves up or down along the joint as needed. When the fastening of the flanges 56, 72 is completed, the band 90 and the seal rings 100, 102 are held within the annular cavity defined within the adjoined inner surfaces 64, 80 of the flanges 56, 72.

The coupling assembly 20 can also be used to couple the upper standpipe section 12 to the middle standpipe section 16; however, in the preferred embodiment the coupling of these two sections is by means of the novel coupling assembly 22 which will be subsequently described after describing the preferred embodiment of the upper standpipe section 12 with which the coupling assembly 22 cooperates. The description of the upper standpipe, or hydrant head, section 12 will be made with particular reference to FIGS. 10-13.

The upper standpipe section 12 includes a support wall 104 having an outer surface 106 and an inner surface 108. The inner surface 108 defines the side boundary of a hollow interior region of the standpipe section 12, which hollow interior region extends from an opening 110 defined by a surface portion 108a at the lower end of the support wall 104 to a partially closed end defined by an inner surface 112 of an end wall 114 intergrally formed to an upper end of the support wall 104.

Defined in the outer surface 106 near the lower end of the support wall 104 is an outer circumferential groove 116 through which a recess 118, such as a machined bore, is defined more radially into the support wall 104. Disposed just above the groove 116 is an outer circumferential groove 120 which carries a sealing O-ring 122 (see FIG. 1).

Defined between the outer and inner surfaces 106, 108 are three nozzle receptacles or water outlet ports 124, 126, 128, each of which contains the same features of the others so that only the nozzle receptacle or water outlet port 124 will be described in detail.

The nozzle receptacle 124, as shown particularly in FIGS. 10, 11 and 13, includes a boss 130 defined by a protruding, thickened portion of the support wall 104. Defined horizontally through the boss 130 is an opening 132. A circular inner retaining wall 135 extends radially inwardly into the opening 132 from the support wall 104. The inner retaining wall 134 includes: a cylindrical inner surface 136 bounding the diameter of a throat defining a narrower portion of the opening 132; an interior surface 138 extending radially outwardly from an inner edge of the inner surface 136 and facing the hollow interior region of the standpipe section 12; and an exterior surface 140 extending radially outwardly from an outer edge of the inner surface 136 and facing exteriorly of the standpipe section 12. Formed integrally adjacent the exterior surface 140 is an outer retaining wall of the nozzle receptacle 124. The outer retaining wall is defined by two semi-circular ridges 142, 144 spaced at their upper and lower ends to define notches 146, 148 in the outer retaining wall. Extending horizontally outwardly from the ridges 142, 144 away from the interior of the hydrant head 12 is a cylindrical surface 150 defining the outermost portion of the opening 132. Extending horizontally inwardly from the interior surface 138 of the inner retaining wall 134 is a cylindrical surface 152 defining an innermost portion of the opening 132. Defined in the surface 152 is a groove 154 spaced from the retaining wall 134 towards the interior of the standpipe section 12. The groove 154 is circular and extends around the entire perimeter at the inlet of the opening 132.

Disposed perpendicular to the cross-section or diameter of the opening 132 is the end wall 114 which extends inwardly from the upper end of the support wall 104. The upper end wall 114 extends inwardly to a cylindrical inner surface 156 defining part of an opening 157 which extends vertically through the upper end or top of the standpipe section or hydrant head 12.

Extending vertically outwardly from the central portion of the end wall 114 around the opening defined by the surface 156 is a cylindrical boss 158 which includes radially offset surfaces 160, 162 further defining the opening 157 extending through the top of the standpipe section 12. The opening portion defined by the surfaces 160, 162 are coaxial with the opening portion defined by the surface 156 of the end wall 114. Four ports 164 (three of which are illustrated in FIG. 11) are defined through the boss 156 between the surface 160 and an exterior surface 165 of the boss 158.

The cylindrical boss 158 is disposed concentrically within a circular rim 166 which is disposed at the upper end of the standpipe section 12 near the outer periphery of the end wall 114. The boss 158 is spaced inwardly from an inner surface 168 of the rim 166 so that an annular channel 170 is defined therebetween. The annular channel 170 is particularly defined by the facing surfaces 165, 168 and an upwardly facing surface 172 of the end wall 114. The annular channel 170 is a trough with which each of the ports 164 communicates; specifically, each of the ports 164 is horizontal and at a height even with the channel 170.

The standpipe section or hydrant head 12 is stacked on top of the middle standpipe section 16 so that the inner surface portion 108a of the support wall 104 of the upper standpipe section 12 receives the upper end of the middle standpipe sectin 16 and is sealed by the sealing member 54 as shown in FIG. 1. In the preferred embodiment this stacked arrangement is directly maintained exclusively by the coupling assembly 22 so that the hydrant head 12 is secured to the middle standpipe section 16 but is rotatable through the coupling assembly 22 relative to the middle standpipe section 16. This coupling assembly 22 will next be described with reference to FIGS. 1 and 14–18.

Figure 16:
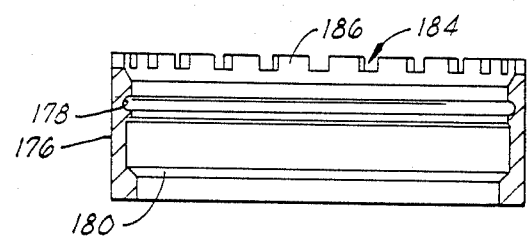
FIG. 16 is a sectional view of the collar taken along line 16—16 shown in FIG. 14.
Figure 17:
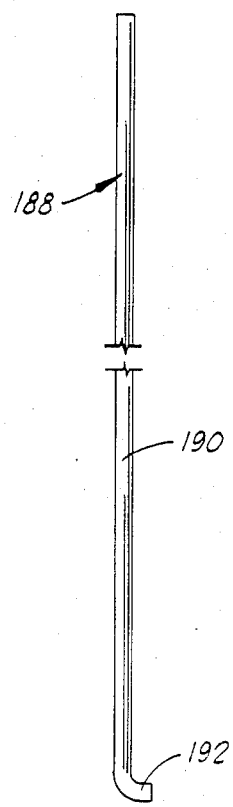
FIG. 17 is a side view of a retainer bar used with the collar of the hydrant.
Figure 18:
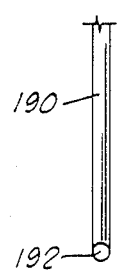
FIG. 18 is a side view of one end of the retainer bar.
Figure 23:
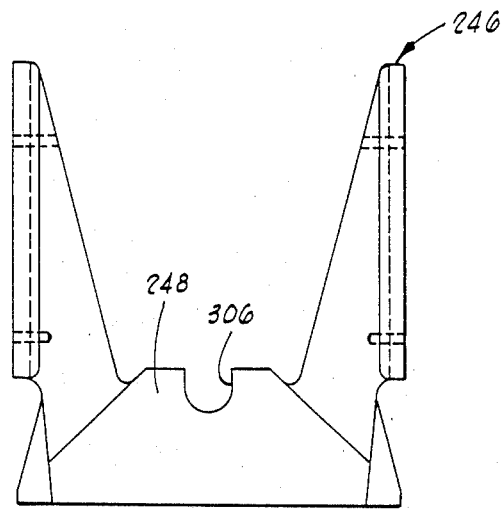
FIG. 23 is an elevational view of a valve body of a valve of the hydrant.
Figure 24:
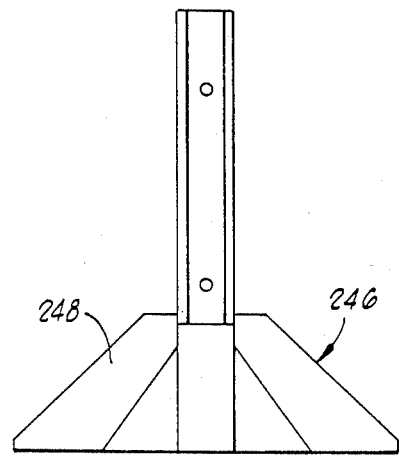
FIG. 24 is an elevational view of another side of the valve body.
Figure 25:
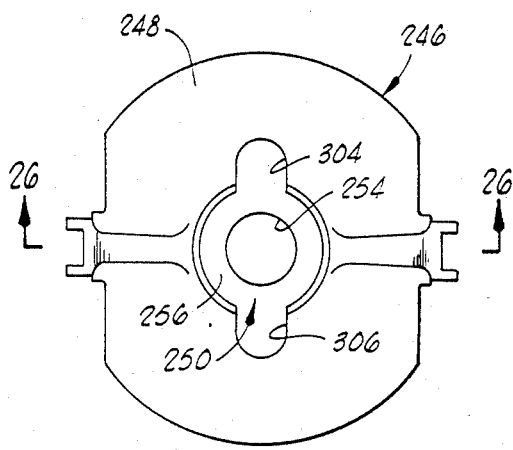
FIG. 25 is a plan view of the valve body.

The coupling assembly 22 includes a retaining sleeve or collar 174 including a cylindrical outer surface 176 and including also inner surfaces defining a substantially cylindrical opening through the collar 174. The inner surfaces include an inner circumferential engagement surface defining a continuous groove 178 around the inside of the collar 174. The inner surfaces also include an inner circumferential engagement surface defining a continuous beveled ledge 180 around the inside of the collar. The beveled ledge 180 is spaced longitudinally downwardly from the groove 178 as shown in FIG. 16, for example. As also shown in FIG. 16, an opening 182 defined through the outer surface 176 intersects the groove 178. The collar 174 further includes an upper circumferential edge in which a plurality of spaces 184 are defined to receive a suitable tool for rotating the collar 174 relative to the coupled standpipe sections 12, 16 (most importantly, with respect to the upper standpipe section 12). The spaces 184 are separated by teeth 186 of the upper circumferential edge of the collar 174.

The coupling assembly 22 also includes a retainer bar 188 initially having a straight shaft 190 terminating at one end in a transverse tip 192. When the coupling assembly 22 is installed, the end or tip 192 is disposed through the hole or opening 182 of the collar 174 and received into the recess 118 (FIG. 11) of the upper standpipe section 12. The shaft 190 of the retainer bar 188 is bent around the standpipe section 12 in response to rotation of the collar 174 relative to the standpipe section 12 so that the retainer bar 188 engages the standpipe section 12 and the inner circumferential engagement surface, or groove, 178 of the collar 174. Specifically, the bar 188 is bent into the groove 116 of the standpipe section 12.

The coupling assembly 22 also includes a retainer ring 194 of the type shown in FIG. 9. The retainer ring 194 is mounted in the groove 50 of the middle standpipe section 16 (see FIG. 1) so that the retaining ring 194 extends therefrom and engages the inner circumferential engagement surface, or beveled ledge, 180 of the collar 174.

To use the coupling assembly 22 in coupling the upper standpipe section 12 to the middle standpipe section 16, the retaining sleeve or collar 174 is slid over the upper end of the middle standpipe section 16. The retainer ring 194 is mounted on the middle standpipe section 16 so that the retainer ring 194 is located between the beveled ledge 180 of the collar 174 and the upper end of the middle standpipe section 16 (namely, in the groove 50). The upper standpipe section 12 is then positioned in alignment with the middle standpipe section 16 with the lower end of the upper standpipe section 12 adjacent the upper end of the middle standpipe section 16. As apparent from FIG. 1, this positioning is accomplished by stacking the hydrant head 12 on top of the middle standpipe section 16 with the surface portion 108a of the hydrant head 12 overlying the upper outer perimeter of the middle standpipe section 16. With the standpipe sections so stacked, the collar 174 is moved relative to the aligned, stacked standpipe sections so that the beveled ledge 180 is adjacent the retainer ring 194 and so that the groove 178 is radially aligned with the external groove 116 of the upper standpipe section 12. The transverse tip end 192 of the retaining rod 188 is inserted through the opening 182 of the collar 174 and retained in the recess 118 of the external groove 116 of the upper standpipe section 12. The collar 174 is then rotated relative to the upper standpipe section 12, thereby pulling the rod 188 through the opening 182 and bending the rod 188 into the external groove 116 so that the rod 188 engages both the groove 116 of the upper standpipe section 12 and the groove 178 of the collar 174, whereby the retainer ring 194, the rod 188 and the collar 174 couple the standpipe section 12 to the standpipe section 16.

With the upper standpipe section 12 connected to the middle standpipe section 16 by the coupling assembly 22, and with the middle standpipe section 16 connected to the water line through the remainder of the supporting conduit structure 6, water from the water line can flow through the conduit defined by the coupled sections to the water outlet ports 124, 126, 128 in which respective nozzle assemblies of the hose connector structure 8 are mounted. Each of the nozzle assemblies in the preferred embodiment has the same components as each other so only a nozzle assembly 196 mounted in the nozzle receptacle 124 will be desribed. This description will be primarily with reference to FIGS. 1 and 19–22.

The nozzle assembly 196 includes a nozzle 198 adapted to fit into the water outlet port or nozzle receptacle 124. The nozzle 128 of the preferred embodiment is an integral unit having an inlet portion 200, an outlet portion 202, and a flange 204.

The inlet portion 200 includes a cylindrical outer surface 206 in which a circumferential groove 208 is defined. When the nozzle 198 is mounted in the nozzle receptacle 124 as shown in FIG. 1, the outer surface 206 is disposed adjacent the inner surface 136 of the retaining wall 134 of the nozzle receptacle 124. A sealing member 210 is disposed in the groove 208 for sealingly engaging the inner surface 136 of the retaining wall 134. The inlet portion 200 also includes an inner surface 212 defining an inlet opening into the nozzle 198. The inner surface 212 has a coupling rib extending radially inwardly therefrom; in the preferred embodiment, the coupling rib is a thread traversing the length of the surface 212.

The outlet portion 202 of the nozzle 198 extends coaxially from the inlet portion 200. The outlet portion 202 has an inner surface 214 defining an outlet opening of the nozzle 198 in communication with the inlet opening defined by the inner surface 212 of the inlet portion 200. The inner surface 214 has a diameter which is smaller than the diameter of the inlet opening, but the outlet opening is coaxial with the inlet opening. The outlet portion 202 also includes an outer surface 216 having a thread 218 for engaging with an internally threaded surface of a nozzle closure cap 220 (see FIG. 1).

The flange 204 of the nozzle 198 extends radially outwardly beyond the outer surfaces 206, 216 of the inlet and outlet portions between which the flange 204 is disposed. The flange 204 includes at least on lug 222 for engaging one of the notches 146, 148 defined in the nozzle receptacle 124. In the preferred embodiment the nozzle 198 includes two lugs 222, one of which is received in the notch 146 and the other of which is received in the notch 148. This provides on the nozzle 198 means for engaging the hydrant head 12 to secure the nozzle 198 within the water outlet port 124 against rotation relative to the hydrant head 12.

The nozzle assembly 196 also includes retainer means for holding the nozzle 198 in the water outlet port 124 in response to the retainer means engaging the inlet portion 200 of the nozzle 198 from within the hydrant head 12. In the preferred embodiment the retainer means includes a retainer ring 224 which is received in the inlet portion 200 of the nozzle 198 and engages the inwardly facing interior surface 138 of the retaining wall 134 of the nozzle receptacle 124 so that the nozzle 198 is connected thereby to the nozzle receptacle 124.

As shown in FIGS. 21 and 22 the retainer ring 224 hs a connector wall 226 defining a cylindrical body. The connector wall 226 has an outer surface 228 having a coupling rib extending radially outwardly therefrom for connecting in overlapping engagement with the coupling rib on the inner surface 212 of the inlet portion 200 of the nozzle 198 to hold the nozzle 198 and the retainer ring 224 together. In the preferred embodiment the coupling rib is a continuous thread formed along the outer surface 228. The mating of the threaded outer surface 228 to the threaded inner surface 212 of the nozzle 198 is shown in FIG. 1. The connector wall 226 also has an inner surface 230 defining a communicating opening communicating the interior of the hydrant head 12 through the inlet opening of the nozzle 198 to the outlet opening of the nozzle 198. The diameter of the opening defined by the inner surface 230 is substantially the same as the diameter of the outlet opening defined by the surface 214 of the nozzle 198 so that a substantially constant diameter flow channel is defined through a nozzle assembly 196 when the retainer ring 224 engages the nozzle 198 in the manner illustrated in FIG. 1 (in the preferred embodiment the diameters are nominally the same).

Extending radially outwardly from the connector wall 226 is a flange 232. The flange 232 has a radial surface 234 abutting the interior surface 138 of the retaining wall 134 of the nozzle receptacle 124 when the nozzle assembly 196 is mounted therein as illustrated in FIG. 1. From FIG. 1 it is apparent that the retainer ring 224, having the flange 232 wider than the throat of the opening through the nozzle receptacle 124, must be installed from within the hydrant head 12 so that it abuts the inwardly facing surface 138. So that the retainer ring 224 can be turned once it is mounted from within the hydrant head 12, the flange 232 includes means for receiving, through the nozzle 198 and the retainer ring 224, from outside the hydrant, a tool with which to turn the retainer ring 224 about its longitudinal axis 236. This receiving means is defined in the preferred embodiment by at least one notch 238 (two of which are shown in the preferred embodiment illustrated in FIGS. 21 and 22). The notches 238 are primarily used to receive a suitable torque-applying tool which imparts to the retainer ring 224 a force by which the ring 224 is disengaged from the nozzle 198 or reconnected thereto or to a replacement nozzle without having to disassemble the hydrant head 12 from the middle standpipe section 16. Although engagement of the retainer ring 224 on the nozzle 198 can also be by means of such a tool, the retainer ring 224 can be readily screwed onto the nozzle 198 by hand when the hydrant head 12 is not mounted on the middle standpipe section 16. A type of tool to be received by the notches 238 is a suitable type of T-spanner wrench which can be inserted through the nozzle assembly 196 from outside the hdyrant 2 but which has outwardly extending elements to be received in the notches 238.

To prevent the retainer ring 224 from falling into the hollow interior portion of the hydrant 2 below the water outlet port 124, the nozzle assembly 196 further includes a backup ring 240 of the type of ring shown in FIG. 9. The backup ring 240 is adapted for mounting within the hydrant head 12 inwardly of the retainer ring 224. Specifically, in the preferred embodiment the backup ring 240 is mounted in the groove 154 of the nozzle receptacle 124. Thus, the backup ring 240 is mounted within the hydrant 2 on the side of the retainer ring 224 opposite the nozzle 198. The backup ring 240 has an inner diameter defining an opening which is smaller than the maximum outer dimension of the retainer ring 224 so that the retainer ring 224 cannot pass through the opening through the backup ring 240, whereby the backup ring 240 prevents the retainer ring 224 from falling into the hydrant 2 when the retainer ring 224 is disengaged from the nozzle 198 (such as when a replacement nozzle is to be attached to the hydrant in the nozzle receptacle 124).

To control the flow of water up through the conduit defined by the coupled standpipe sections to the nozzle assemblies, the water flow control structure 10 is used in the hydrant 2. The water flow control structure 10 includes a valve 242 and vave actuating means for opening and closing the valve 242.

The valve 242 includes a valve seat 224 shown in FIG. 1. The valve seat 244 is of a conventional construction and is shown in FIG. 1 to be mounted to the lower standpipe section 14 at its junction with the shoe 4.

Figure 26:
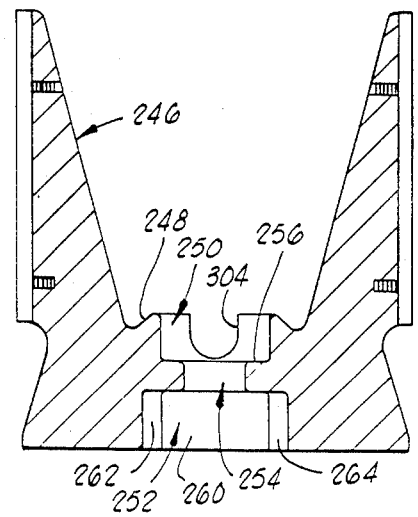
FIG. 26 is a sectional view of the valve body taken along line 26—26 shown in FIG. 25.
Figure 27:
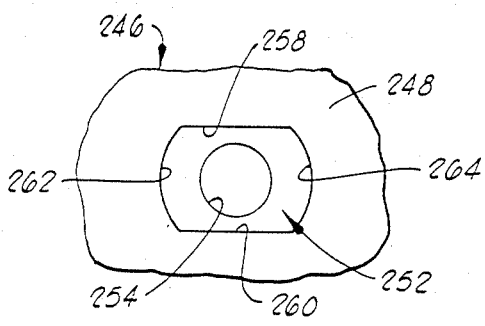
FIG. 27 is a partial view of the valve body from below showing a lower cavity of a hub of the valve body.

Slidably disposed within the valve seat 244 is a valve body 246 having a conventional design shown in FIGS. 23–26 except for the design of a lower cavity depicted in FIGS. 26 and 27. The valve body 246 includes a central hub 248 having an upper portion in which an upper cavity 250 is defined. The hub 248 also includes a lower portion in which a cavity 252 is defined and a central portion through which an opening 254 is defined and extends between the coaxially aligned upper and lower cavities 250, 252.

The upper cavity 250 includes an annular surface 256 defining the bottom of the cavity 250. The surface 256 encircles the upper mouth of the opening 254.

The lower cavity 252 includes the novel configuration of the present invention in that it includes two spaced mutually facing, parallel planar side surfaces 258, 260 and two spaced, mutually facing curved side surfaces 262, 264 extending between respective ends of the planar surfaces 258, 260. These surfaces give the cavity 252 a "double-D" (back-to-back) configuration.

The valve 242 also includes a conventional seal member 266 having an annular, disk shape as shown in FIGS. 28 and 29. A cylindrical surface 268 defines an opening through the disk 266.

Supporting the seal member 266 from below is a seal retainer means for retaining the seal member 266 against the valve body 246. The seal retainer means of the preferred embodiment, shown by itself in FIGS. 30 and 31, includes a disk 270 having an annular surface 272 which engages the underside of the seal member 266 as shown in FIG. 1. Protruding from the center of the disk 270 from the surface 272 is a boss 274. The boss 274 has two spaced parallel planar side surfaces 276, 278 and two spaced curved side surfaces 280, 282 extending between respective ends of the planar surfaces 276, 278. The boss 274 is received in the lower cavity 252 of the valve body 246 as shown in FIG. 1. The boss 274 is received with its planar and curved surfaces lying adjacent respective ones of the planar and curved surfaces of the lower cavity 252 so that the boss 274 non-rotatably nests in the lower cavity 252. The boss 274 also includes a central hole 284 having a threaded surface.

Other seal members of the valve 242 are identified in FIG. 1 by the reference numerals 286, 288. These are of conventional design and utility. Both have the same design so that only the seal member 286 is shown in detail in FIGS. 32 and 33.

Figure 36:
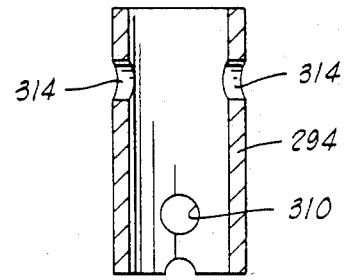
FIG. 36 is a sectional elevational view of a breakaway coupling for the valve stem of the valve of the hydrant.
Figure 38:
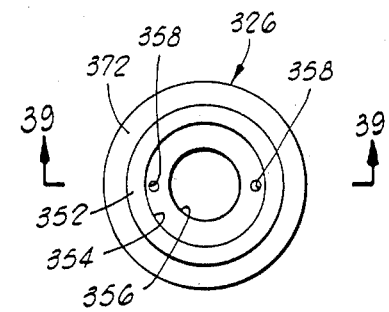
FIG. 38 is a top view of an operating nut of the hydrant.

The valve 242 also includes a valve stem which couples the rest of the valve 242 to the valve actuating means. The valve stem of the preferred embodiment includes a lower valve stem section 290 (FIG. 34), an upper valve stem section 292 (FIG. 35), and a coupling sleeve 294 (FIG. 36). The lower valve stem section 290 has a lower annular shoulder 296 from which a threaded member 298 extends. As shown in FIG. 1, the threaded member 298 extends through the upper cavity 250, the opening 254 and the lower cavity 252 of the valve body 246 into engagement within the threaded hole 284 of the seal retainer disk 270 for tightening the seal member 266 and the seal retainer disk 270 against the valve body 246. To secure the lower valve stem section 290 against rotation relative to the valve body 246, a pin 300 (FIG. 1) extends through an opening 302 (FIG. 34) near the lower end of the lower valve stem section 290 and engages U-shaped surfaces 304, 306 (FIGS. 23, 25, 26) of the hub 248 of the valve body 246. The lower valve stem section 290 has a hole 308 defined transversely through its upper end for receiving a pin 309 (FIG. 1) whose outer ends are received through diametrically aligned holes 310 (one shown in FIG. 36) of the coupling sleeve 294. This assembly is connected to the lower end of the upper valve stem section 292 by means of a pin 312 (FIG. 1) extending through holes 314 (FIG. 36) of the coupling sleeve 294 and a hole 316 (FIG. 35) of the upper valve stem section 292. The upper end of the valve stem section 292 includes a transverse hole 318 above which a threaded shaft 320 extends from the main body of the upper valve stem section 292. The hole 318 and the threaded shaft 320 are used in connecting the valve stem with the valve actuating means as subsequently described hereinbelow.

To seal the lower end of the valve stem against the valve body 246, the valve 242 also includes a flat sealing gasket 322 (FIG. 1) disposed in the annular region between the annular surface 256 of the upper cavity 250 of the hub 248 of the valve body 246 and the downwardly facing annular shoulder 296 of the lower valve stem section 290.

Connected to the upper end of the valve stem and also connected to the upper standpipe section 12 is the valve actuating means. In the preferred embodiment the valve actuating means is an operating assembly for the valve stem through which the valve body 246 and the seal members 266, 286, 288 connected thereto are moved between closed and open positions. The operating assembly of the preferred embodiment is implemented to provide continuous lubrication of the threaded shaft 320 of the valve stem and to prevent hydralock even if the lubricating fluid is filled or refilled with the valve stem lowered, the significance of which will become more apparent with the description of the operating assembly hereinbelow.

Figure 37:
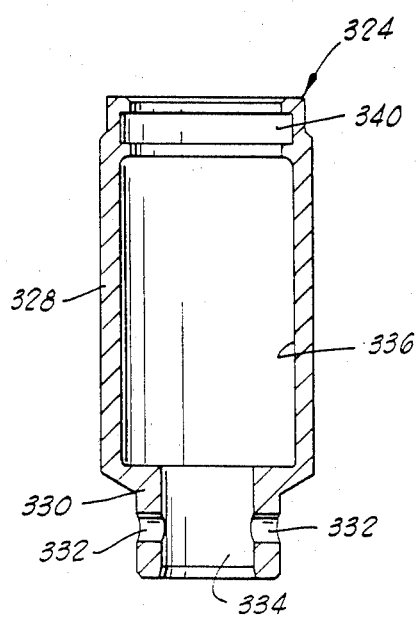
FIG. 37 is a sectional elevational view of an operating sleeve of the hydrant.
Figure 39:
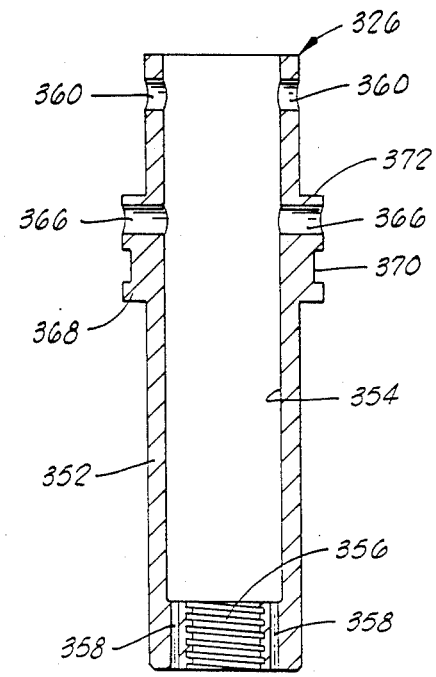
FIG. 39 is a sectional view of the operating nut taken along line 39—39 shown in FIG. 38.
Figure 40:
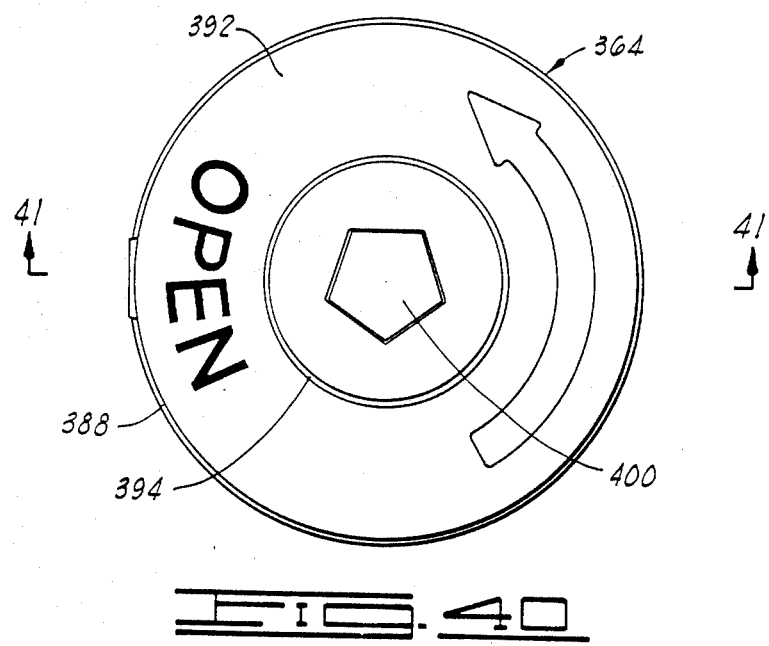
FIG. 40 is a top view of a hydrant bonnet of the hydrant.

The operating assembly includes a sliding member or operating sleeve 324 forming a sealed fluid container between the upper valve stem portion 292 and an operating nut 326 forming another part of the operating assembly. The operating sleeve 324 is shown by itself in FIG. 37. It has a generally cylindrical body 328 from which a narrower cylindrical neck portion 330 extends. Two diametrically aligned holes 332 are defined through the neck 330. The neck 330 has an inner surface 334 defining a hollow throat communiating with a hollow interior defined by an inner surface 336 of the cylindrical body 328.

As shown in FIG. 1, the threaded shaft 320 of the upper valve stem section 292 extends into the hollow interior region of the cylindrical body 328, and the portion of the upper valve stem section 292 containing the hole 318 is disposed in the throat defined by the surface 334 so that the hole 318 is aligned with the holes 332. A pin 338 extending through the aligned holes 318, 332 fixes the valve stem relative to the operating sleeve 324. The interface between the upper valve stem section 292 and the throat of the operating sleeve 324 is sealed by an O-ring 348 (FIG. 1) disposed in a groove 350 (FIG. 35) defined in the upper valve stem section 292.

The upper end of the operating sleeve 324 has an inner circumferential groove 340 in which a pair of seal members 342, 344 (FIG. 1), separated by a backup element, are disposed for sealingly engaging the operating nut 326 having a lower portion slidably extending through the seals 342, 344 into the hollow interior of the body 328 of the operating sleeve 324. To limit the relative movement between the operating sleeve 324 and the operating nut 326, a travel stop nut 346 (FIG. 1) is connected at the top of the threaded shaft 320 of the upper valve stem section 292.

The operating nut 326 includes a main cylindrical body 352 having an inner surface 354 defining a chamber within the operating nut 326. The lower end of the body 352 includes an end wall through which a threaded opening 356 is defined. One or more longitudinal openings 358 extends through the lower end of the body 352 parallel to the threaded opening 356. The threaded opening 356 receives and engages the threaded shaft 320 of the upper valve stem section 292 as illustrated in FIG. 1; the parallel openings 358 allow lubricating fluid, such as oil, contained within the chamber defined by the surface 354 to flow into the hollow interior of the operating sleeve 324 when the components are assembled as illustrated in FIG. 1.

The body 352 of the operating nut 326 has two diametrically aligned openings 360 defined therethrough for receiving a pin 362 (FIG. 1) by which the operating nut 326 is connected to a hydrant bonnet 364 forming another part of the operating assembly of the valve actuating means. As shown in FIG. 1, the upper end of the body 352 extends through the opening 157 of the upper end of the hydrant head 12.

To communicate the ports 164 of the boss 158 of the hydrant head 12 with the chamber defined by the surface 354 of the body 352 of the operating nut 326, two diametrically aligned ports 366 are defined through a hub portion 368 of the body 352. Also defined in the hub portion 368 is an outer circumferential groove 370. The hub portion 368 includes an upper annular shoulder 372 against which a torque-reducing thrust washer 374 (such as one made of glass-filled Teflon ®) sits when the operating nut 326 is positioned as shown in FIG. 1 with the upper surface of the thrust washer 374 adjacent the under side of the top of the boss 158 of the hydrant head 12. When the operating nut 326 is so positioned, the ports 366 can align with the ports 164 through the boss 158 and are otherwise in fluid communication with them. This allows lubricating fluid to flow from the annular channel 170 of the hydrant head 12 through the ports 164 and the ports 366 into the chamber of the operating nut 326 and on into the fluid containing portion of the operating sleeve 324. To prevent leakage between the end wall 114 of the hydrant head 12 and the hub portion 368 of the operating nut 326, a pair of sealing rings 376, 378 separated by a backup element are retained within the groove 370 in sealing engagement with the surface 156 of the opening 157 defined through the end wall 114 of the hydrant head 12. This sealing is created below the ports 366 of the operating nut 326 and below the ports 164 of the boss 158.

Figure 41:
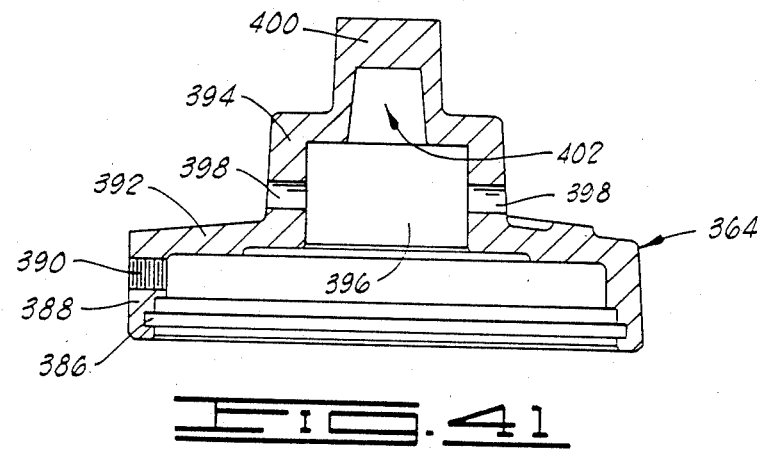
FIG. 41 is a sectional view of the hydrant bonnet taken along line 41—41 shown in FIG. 40.
Figure 42:
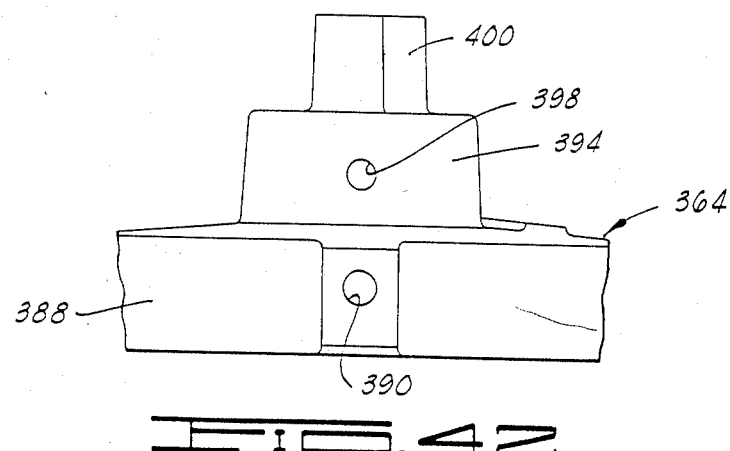
FIG. 42 is a partial elevational view of the hydrant bonnet.

The hydrant bonnet 364 to which the operating nut 326 is connected by the pin 362 is sealingly connected to the top of the hydrant head 12 so that an excess reservoir volume 380 is defined by the hydrant bonnet 364 contiguous with the fluid-receiving channel 170 (see FIG. 1). Specifically, the hydrant bonnet 364 is rotatably mounted on the top of the boss 158 by means of a torque-reducing thrust washer 382 (such as one made of glass-filled Teflon ®). The sealing connection is defined by an O-ring 384 mounted in a groove 386 (FIG. 41) of a circumferential wall 388 of the hydrant bonnet 364 for creating a seal between the outer surface of the rim 166 of the hydrant head 12 and the circumferential wall 388 of the hydrant bonnet 364.

The circumferential wall 388 encircles the rim 166 and has a lower, free edge disposed adjacent the rim 166. The circumferential wall 388 extends vertically upwardly beyond the top of the rim 166 to an upper periphery which is integrally formed with the main or central body of the hydrant body 364. A fluid fill port 390 is defined through the circumferential wall 388. The port 390 is in communication with the excess reservoir volume 380 above the fluid-receiving channel 170 of the hydrant head 12. That is, the port 390 is in a portion of the circumferential wall 388 vertically beyond the rim 166 so that the port 390 communicates with the excess reservoir volume 380 which in the preferred embodiment provides an annularly shaped reservoir into which at least a portion of the lubricating fluid can flow if needed in response to raising of the valve stem. Because the circumferential wall 388 depends from the main body of the bonnet 364, it can also be referred to as a skirt wall.

The main body of the bonnet 364 includes a radial wall 392 extending radially inwardly from the upper periphery of the circumferential wall 388 in overlying relationship to the fluid-receiving channel or trough 170 and the boss 158. Thus, the annular excess reservoir volume 380 is defined by portions of the circumferential wall 388, the radial wall 392 and the boss 158 above the annular channel 170 as is depicted in FIG. 1.

Extending vertically above the radial or lateral wall 392 is a cylindrical wall 394. The wall 394 extends from an inner periphery of the radial wall 392 so that a cavity 396 is defined by the cylindrical wall 394 in communication with the opening of the upper end of the hydrant head 12 which is communicated thereto through the wider cavity defined by the skirt wall 388. Two diametrically aligned holes 398 are defined horizontally through the cylindrical wall 394 for receiving ends of the pin 362 by which the operating nut 326 is connected to the hydrant bonnet 364.

Extending above the cylindrical wall 394 is a lug 400 having a cavity 402 defined therein in communication with the cavity 396.

The total volume of excess reservoir volume 380, cavity 396 and cavity 402 is large enough to accommodate the valve stem being drawn up if the lubricating fluid has been filled with the valve stem down.

With the operating assembly assembled and mounted on the hydrant as shown in FIG. 1, lubricating fluid, such as oil, is poured in through the port 390 after a closure plug 404 has been removed from the port 390. This lubricating fluid flows into the channel 170, through the ports 164 of the boss 158, through the ports 366 of the operating nut 326 and into the chamber defined by the inner surface 354 of the operating nut 326. This fluid flows down through the chamber of the operating nut 326 and on through the openings 358 and the unsealed meshing threads through the opening 356 for filling the fluid-receiving container or chamber defined in the operating sleeve 324. This filling can continue until fluid flows back out of the port 390 thereby indicating that the fill line defined coincident with the bottom of the port 390 has been reached. This filling procedure can be done with the valve stem in either the raised or lowered position. If it is done in the raised position, there is no concern for hydralock because the minimum lubricating fluid volume has been filled. If the valve stem is in the lowered position when the filling occurs, there is likewise no concern for hydralock because even when the valve stem is raised, fluid displaced from below the fill line will simply be received in the excess reservoir volume 380 and even up into the cavities 396, 402 of the hydrant bonnet 364, if necessary.

Other than as has been described hereinabove with reference to novel and improved features of the present invention, the hydrant 2 is operated in a conventional manner in controlling the flow of water through the valve 242 to the nozzle assemblies for output therethrough and in controlling drainage of water from the standpipe section when the valve 242 is closed. Likewise, the materials of construction are conventional.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An operating assembly for a valve stem of a valve of a hydrant, said operating assembly comprising:

a hydrant head standpipe section having a top in which an exterior surface thereof defines a fluid-receiving channel for receiving a lubricant;

a hydrant bonnet sealingly connected to said top of said hydrant head standpipe section so that an excess reservoir volume cavity for receiving said lubricant is defined by said hydrant bonnet contiguous with said fluid-receiving channel of said hydrant head standpipe section; and an operating nut connected to said hydrant bonnet and adapted for coupling with the valve stem of the hydrant, said operating nut having defined therein a chamber adapted to receive an end of the valve stem and disposed in communication with said fluid-receiving channel and said excess reservoir volume cavity during movement of the valve stem in said operating nut for displacing an excess amount of said lubricant into said fluid-receiving channel and said excess reservoir volume cavity to prevent hydralock of the valve stem.

2. An operating assembly as defined in claim 1, wherein said hydrant bonnet has another cavity defined therein in communication with said chamber of said operating nut for preventing hydralock of the valve stem.

3. An operating assembly as defined in claim 2, wherein said hydrant bonnet has a fluid fill port defined therein in communication with said excess reservoir volume cavity below said another cavity of said hydrant bonnet and above said fluid-receiving channel of said hydrant head standpipe section.

4. An operating assembly for a valve stem of a valve of a hydrant which also includes a standpipe section, said operating assembly comprising:

a hydrant head having an upper end with an opening defined therethrough and having a lower end adapted to be connected to the standpipe section of the hydrant, said hydrant head including:
a circular rim disposed at said upper end near an outer periphery thereof; and
a cylindrical boss disposed at said upper end concentrically within said rim so that an annular channel for receiving a lubricant is defined between said rim and said boss, said boss having said opening of said upper end defined vertically therethrough and said boss having a port defined therethrough communicating said annular channel and said opening of said upper end;

a hydrant bonnet mounted on said hydrant head, including:
a circumferential wall encircling and disposed adjacent said rim and extending vertically beyond said rim to an upper periphery; and
a radial wall extending radially inwardly from said upper periphery of said circumferential wall so that an annular reservoir for receiving a lubricant is defined by said radial wall, said circumferential wall and said boss above said annular channel;

an operating nut including a cylindrical body in which a chamber is defined, said body having an upper end extending through said opening of said upper end of said hydrant head and connected to said hydrant bonnet and said body having a lower end adapted to connect to the valve stem of the hydrant, said body also including a port defined therethrough communicating said port of said boss and said chamber of said body of said operating nut with said lubricant; and said annular reservoir and said annular channel defining means for receiving an excess amount of said lubricant therein to prevent hydralock of the valve stem during movement of the valve stem within said operating nut.

5. An operating assembly as defined in claim 4, wherein said circumferential wall of said hydrant bonnet includes a fill port defined within a portion of said circumferential wall extending vertically beyond said rim so that said fill port communicates with said annular reservoir.

6. An operating assembly as defined in claim 4, further comprising:
first seal means for creating a seal between said body of said operating nut and said upper end of said hydrant head below said port defined through said boss of said hydrant head; and
second seal means for creating a seal between said rim of said hydrant head and said circumferential wall of said hydrant bonnet.

7. An operating assembly as defined in claim 6, wherein:
said operating assembly further comprises an operating sleeve having an upper end sealingly engaging said body of said operating nut, said operating sleeve further having a lower end adapted for sealingly engaging the valve stem of the hydrant, said operating sleeve also including a hollow interior through which said lower end of said body of said operating nut is movable; and
said body of said operating nut includes an opening defined therethrough communicating said chamber of said body of said operating nut and said hollow interior of said operating sleeve.

8. An operating assembly as defined in claim 7, wherein said hydrant bonnet further includes:
a cylindrical wall extending vertically above said radial wall of said hydrant bonnet from an inner periphery of said radial wall, said cylindrical wall having a lower cavity defined therein in communication with said opening of said upper end of said hydrant head; and
a lug extending from said cylindrical wall, said lug having an upper cavity, communicating with said lower cavity, defined therein so that an excess of said lubricant is receivable therein for preventing hydralock of the valve stem.

9. An operating assembly as defined in claim 8, wherein:
said cylindrical wall of said hydrant bonnet has two diametrically aligned horizontal holes defined therein;
said upper end of said body of said operating nut extends into said lower cavity and includes two diametrically aligned horizontal holes aligned with said two diametrically aligned horizontal holes of said cylindrical wall of said hydrant bonnet; and
said operating assembly further comprises a pin retained through said aligned holes of said cylindrical wall and said upper end of said body of said operating nut so that said operating nut is thereby connected to said hydrant bonnet with said chamber of said body of said operating nut communicating with said upper cavity defined in said lug.

10. An operating assembly as defined in claim 9, wherein said circumferential wall of said hydrant bonnet includes a fill port defined within a portion of said circumferential wall extending vertically beyond said rim so that said fill port communicates with said annular reservoir.

11. An operating assembly as defined in claim 4, wherein: said operating assembly further comprises an
   operating sleeve having an upper end sealingly engaging said body of said operating nut, said operating sleeve further having a lower end adapted for sealingly engaging the valve stem of the hydrant, said operating sleeve also including a hollow interior through which said lower end of said body of said operating nut is movable; and
   said body of said operating nut includes an opening defined therethrough communicating said chamber of said body of said operating nut and said hollow interior of said operating sleeve.

12. An operating assembly as defined in claim 4, wherein said hydrant bonnet further includes:
   a cylindrical wall extending vertically above said radial wall of said hydrant bonnet from an inner periphery of said radial wall, said cylindrical wall having a lower cavity defined therein in communication with said opening of said upper end of said hydrant head; and
   a lug extending from said cylindrical wall, said lug having an upper cavity, communicating with said lower cavity, defined therein so that an excess of said lubricant is receivable therein for preventing hydralock of the valve stem.

13. An operating assembly as defined in claim 12, wherein:
   said cylindrical wall of said hydrant bonnet has two diametrically aligned horizontal holes defined therein;
   said upper end of said body of said operating nut extends into said lower cavity and includes two diametrically aligned horizontal holes aligned with said two diametrically aligned horizontal holes of said cylindrical wall of said hydrant bonnet; and
   said operating assembly further comprises a pin retained through said aligned holes of said cylindrical wall and said upper end of said body of said operating nut so that said operating nut is thereby connected to said hydrant bonnet with said chamber of said body of said operating nut communicating with said upper cavity defined in said lug.

14. An operating assembly for a valve stem of a valve of a hydrant which also includes a standpipe section, said operating assembly comprising:
   a hydrant head, including:
      a support wall having a lower end adapted to be connected to the standpipe section of the hydrant;
      an end wall extending inwardly from an upper end of said support wall, said end wall including an inner surface defining an opening through said end wall;
      a boss extending outwardly from said end wall around said opening, said boss including an inner surface defining an opening coaxial with said opening of said end wall, said boss further including a port defined therethrough; and
      a rim extending outwardly from said end wall so that a trough, communicating with said port of said boss, is defined between said rim and said boss;
   a hydrant bonnet disposed on said boss so that said bonnet is rotatable relative to said hydrant head, said hydrant bonnet including:
      a main body having a lateral wall overlying said boss and said trough; and
      a skirt wall depending from said lateral wall to a free edge of said skirt wall adjacent said end wall of said hydrant head outside said rim of said hydrant head so that an excess reservoir volume overlying said trough is defined for receiving a lubricant;
   an operating nut connected to said hydrant bonnet so that said operating nut rotates with said hydrant bonnet, said operating nut including a body including a chamber defined therein for receiving an end of the valve stem of the hydrant, said body further including a port defined therethrough in communication with said chamber and said port of said boss for communicating said lubricant; and
   said excess reservoir volume and said trough defining means for receiving an excess amount of said lubricant therein to prevent hydralock of the valve stem during movement of the valve stem within said operating nut.

15. An operating assembly as defined in claim 14, wherein:
   said operating assembly further comprises sleeve means for forming a sealed fluid container between said operating nut and the valve stem; and
   said body of said operating nut has an opening defined therethrough communicating said chamber of said body of said operating nut with said fluid container of said sleeve means.

16. An operating assembly as defined in claim 15, wherein said sleeve means includes:
   a sliding member having a first end adapted for connection to the valve stem and having a second end in which a groove is defined and through which said operating nut is received; and
   two seal members disposed in said groove of said sliding member of said sleeve means and engaging said operating nut.

17. An operating assembly as defined in claim 14, wherein:
   said body of said operating nut has a groove defined therein; and
   said operating assembly further comprises two seal members disposed in said groove in sealing engagement with said inner surface of said end wall of said hydrant head.

18. An operating assembly as defined in claim 14, wherein said main body of said hydrant bonnet has a cavity defined therein in communication with said chamber of said body of said operating nut.

19. An operating assembly as defined in claim 14, further comprising seal means for providing a fluid-tight seal between said skirt wall of said hydrant bonnet and said rim of said hydrant head.

20. An operating assembly as defined in claim 14, wherein said skirt wall has a fill port defined therethrough in communication with said excess reservoir volume.

* * * * *